United States Patent
Sun

(10) Patent No.: US 12,458,234 B2
(45) Date of Patent: Nov. 4, 2025

(54) CAMERA APPARATUS FOR MEDICAL DETECTION

(71) Applicant: ScopeAround, Irvine, CA (US)

(72) Inventor: Yingjie Sun, Irvine, CA (US)

(73) Assignee: ScopeAround, Irvine, CA (US)

( * ) Notice: Subject to any disclaimer, the term of this patent is extended or adjusted under 35 U.S.C. 154(b) by 37 days.

(21) Appl. No.: 18/416,295

(22) Filed: Jan. 18, 2024

(65) Prior Publication Data

US 2025/0204787 A1  Jun. 26, 2025

(30) Foreign Application Priority Data

Dec. 25, 2023 (CN) .......................... 202323546163.3

(51) Int. Cl.
| | | |
|---|---|---|
| *A61B 5/00* | (2006.01) | |
| *H04N 23/50* | (2023.01) | |
| *A61B 1/227* | (2006.01) | |
| *A61B 1/24* | (2006.01) | |

(52) U.S. Cl.
CPC .............. *A61B 5/0077* (2013.01); *A61B 5/74* (2013.01); *H04N 23/555* (2023.01); *A61B 1/227* (2013.01); *A61B 1/24* (2013.01)

(58) Field of Classification Search
CPC .............. G02B 21/0008; G02B 21/084; A61B 1/00105; A61B 1/24; A61B 1/227
See application file for complete search history.

(56) References Cited

U.S. PATENT DOCUMENTS

| | | |
|---|---|---|
| 11,160,633 B2 | 11/2021 | Tamura et al. |
| 11,331,160 B2 | 5/2022 | Mak et al. |
| 11,633,255 B2 | 4/2023 | Orozco et al. |
| 11,712,319 B2 | 8/2023 | Watson et al. |
| 11,717,375 B2 | 8/2023 | McDowall et al. |
| 2016/0338590 A1* | 11/2016 | Sagalovich ........ A61B 1/00066 |
| 2018/0125345 A1* | 5/2018 | Rebella .................. A61B 1/015 |

* cited by examiner

*Primary Examiner* — Alazar Tilahun

(57) ABSTRACT

Disclosed is a camera apparatus for medical detection, including: a shell, a circuit board arranged in the shell, and a data cable and a detection sensor which are electrically connected to the circuit board. A probe is arranged on an outer side of the shell, the probe is electrically connected to the circuit board, and an adapting piece is sleeved on an outer side of the probe. The detection sensor is configured to detect whether the adapting piece is mounted at a set position of the probe or not. The circuit board controls a working state of the probe according to the detection result of the detection sensor.

8 Claims, 7 Drawing Sheets

CAMERA APPARATUS FOR MEDICAL DETECTION

CROSS REFERENCE TO RELATED APPLICATION

This application claims priority benefit of Chinese patent Application No. 202323546163. 3, filed on Dec. 25, 2023, and the entire contents of which are incorporated herein by reference.

TECHNICAL FIELD

The present disclosure relates to the field of medical instruments, and in particular to a camera apparatus for medical detection.

BACKGROUND

It is necessary to detect the skin, hair, mouth, throat, teeth, ear canal and nasal cavity of patients in medical treatment. Generally, during detection, a detection part is irradiated through an LED lamp, and through naked eye observation, the deep position such as the oral cavity and the ear canal cannot be seen clearly by naked eyes, hereby affecting the detection result. Therefore, a camera apparatus for medical detection is proposed.

SUMMARY

A main objective of the present disclosure is to provide a camera apparatus for medical detection, which can effectively solve the problem in the background art.

To achieve the above objective, the present disclosure adopts the following technical solution:

a camera apparatus for medical detection includes a shell; an inner side of the shell is fixedly connected to a circuit board; the circuit board is electrically connected to a data cable; and the data cable is configured to connect a digital multi-functional medical camera to a mobile phone, a computer, a display and other external devices. The circuit board is electrically connected to a detection sensor, and the detection sensor is configured to control a switch of the digital multi-functional medical camera. When the data cable is connected to the mobile phone, the computer, the display and other devices, the camera is electrified to enter a stand-by state. When an adapting structure is mounted on an outer side of a probe, the adapting structure touches the detection sensor, the detection sensor sends a signal to the circuit board, and the circuit board controls the probe to enter a working state and output an image through the data cable. The detection sensor may be a physical on-off switch, or may be digital sensor switch. The circuit board is electrically connected to the probe, and the probe is a probe of a medical camera. The circuit board is a circuit board of the digital multi-functional medical camera, and is configured to control the on and off of the camera, drive the camera to work and transmit an image to the mobile phone, the computer, the display and other devices. The mobile phone, the computer, the display and other devices are required to be networked and perform real-time remote video medical diagnosis through a video communication software system. An adapting piece is sleeved on an outer side of the probe.

In some embodiments, the adapting piece includes a first adapter buckled with one end of the shell, and the first adapter is sleeved on the outer side of the probe and is configured to detect skin and hair.

Further, one end of the first adapter away from the shell is set as a bell mouth to enlarge the detection range.

In some embodiments, the adapting piece further includes a second adapter buckled with one end of the shell, and the probe is arranged on an upper side of the second adapter and is configured to detect the oral cavity, throat and teeth.

Further, one end of the second adapter away from the shell is set as a flat shape, so that the tongue can be pressed conveniently by the second adapter, and the influence on the detection by the upwarped tongue is avoided.

In some embodiments, the adapting piece further includes a third adapter buckled with one end of the shell; and a diameter of a main body part of the third adapter decreases gradually from one end close to the shell to one end away from the shell, and the main body part is configured to detect the ear canal and nasal cavity.

Further, a retainer ring is arranged on an outer side of the third adapter, and the retainer ring can prevent the third adapter from being inserted into the ear canal too deeply, and human injury can be avoided.

In some embodiments, the adapting piece further includes a fourth adapter buckled with one end of the shell;
  a diameter of a main body part of the fourth adapter decreases gradually from a first end close to the shell to a second end away from the shell; and several clamping ribs are arranged in a circumferential direction of an inner wall of the fourth adapter, a clamping channel is surrounded by the several clamping ribs, and the clamping channel is buckled with the shell.

Further, an accommodating cavity is formed between the first end of the fourth adapter and the clamping channel; and when the fourth adapter is buckled with the shell, one part of the shell will remain in the accommodating cavity.

In some embodiments, the adapting piece further includes a fifth adapter; and
  a first end of the fifth adapter is in buckling connection with the shell, and a ring cover is arranged on an outer side of the fifth adapter close to the first end of the fifth adapter.

Further, the cross section of the ring cover has an arc-shaped structure, the arc-shaped structure gradually extends towards a direction of the first end of the fifth adapter and in a radial direction of the fifth adapter, and one side of the arc-shaped structure facing away from the first end of the fifth adapter and an outer wall of the fifth adapter are in smooth transition.

Further, the detection sensor is a non-contact sensor or a contact sensor;
  the detection sensor is arranged at the probe or the shell; when the adapting piece is mounted at the set position of the probe, the detection sensor is capable of detecting the adapting piece or a sensing device mounted on the adapting piece are magnet; the sensing device is adapted to the detection sensor, for example, the detection sensor is a Hall sensor, then the sensing device is a magnet;
  the contact sensor includes a travel switch and a contact switch; and
  the non-contact sensor includes a photoelectric sensor, an infrared sensor, an electromagnetic sensor, an ultrasonic sensor, a laser sensor and the like, such as a Hall sensor.

Further, the shell is provided with an indicator lamp for the working state of the camera apparatus for medical detection, and the indicator lamp is electrically connected to the circuit board.

The present disclosure has the following beneficial effects:

compared with the prior art, the camera apparatus for medical detection includes a data cable, a shell, a circuit board, a contact sensor, a probe and an adapting piece. The adapting piece is provided with various adapters according to different diagnosis requirements. Different adapters can perform image acquisition on different affected parts. The affected parts include, for example, the skin, hair, oral cavity, throat, teeth, ear canal and nasal cavity. The probe goes deep into the deep parts of some of the affected parts for detection, thereby ensuring the detection accuracy. During image acquisition, through the probe, the acquired image can be displayed by the mobile phone, the computer or other displays, so that medical staff can watch the image conveniently and intuitively, and it is ensured that the medical staff can confirm the situation of the detection part in real time. In addition, some of the adapting pieces are provided with constraint settings. The constraint settings include, for example, a retainer ring of the third adapter, the fourth adapter adopting a conical structure design, and the fifth adapter being provided with a ring cover, so that the adapter can be prevented from being into the affected part too deeply, and human injury can be avoided.

In addition, the camera apparatus for medical detection is further provided with a detection sensor for detecting whether an adapting piece is mounted on the outer side of the probe or not. Furthermore, the adapting piece is necessarily mounted on the probe correctly before the probe can enter the working state. The illegal inspection when not adapting piece is mounted can be avoided.

Thirdly, the adaption of the present application includes various schemes, which can be suitable for detecting different parts.

BRIEF DESCRIPTION OF DRAWINGS

To describe the technical solutions of the present disclosure more clearly, the accompanying drawings required to be used in the technical description of the present disclosure are described simply. Obviously, the accompanying drawings in the following description show merely some embodiments of the present disclosure. Those of ordinary skill in the art can also derive other accompanying drawings from these accompanying drawings without making creative efforts.

Figure 1:
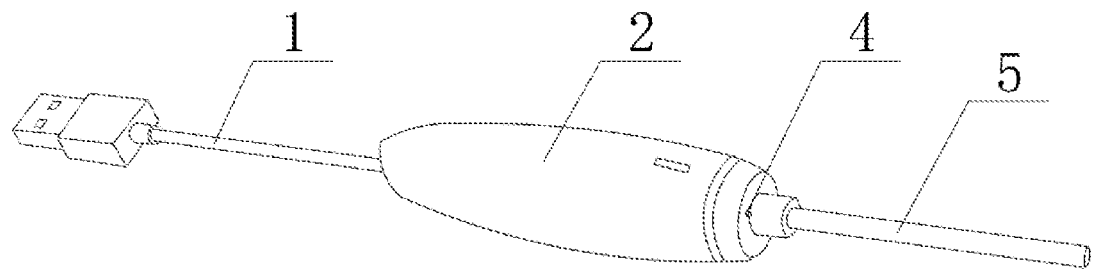
FIG. 1 is a schematic diagram of an overall structure.

In the drawings: 1—data cable; 2—shell; 3—circuit board; 4—contact sensor; 5—probe; 6—first adapter; 7—second adapter; 8—third adapter; 801—retainer ring; 9—fourth adapter; 901—clamping rib; 902—clamping channel; 903—accommodating cavity; 10—fifth adapter; 1001—ring cover; 1002—magnet; 11—Hall sensor; 12—indicator lamp.

DETAILED DESCRIPTION OF THE EMBODIMENTS

The present disclosure will be described in detail below with reference to the accompanying drawings and in conjunction with embodiments. Various examples are provided by way of interpretation of the present disclosure and are not intended to limit the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. Therefore, it is desirable that the present disclosure includes such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings and are intended for ease of description only and not to require that the present disclosure is necessarily constructed and operated in a particular orientation and therefore cannot be construed as a limitation to the present disclosure. The terms "connection", "connect" and "set" used in the present disclosure should be understood in a broad sense, for example, which may refer to a fixed connection or a detachable connection; which may refer to a direct connection or an indirect connection through intermediate components; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter marks to refer to features in the drawings. Similar or like reference signs in the drawings and descriptions have been used to refer to similar or like parts of the present disclosure. As used herein, the terms "first", "second" and "third" and the like are used interchangeably to distinguish one member from another and are not intended to denote the location or importance of individual members.

Embodiment 1

Figure 2:
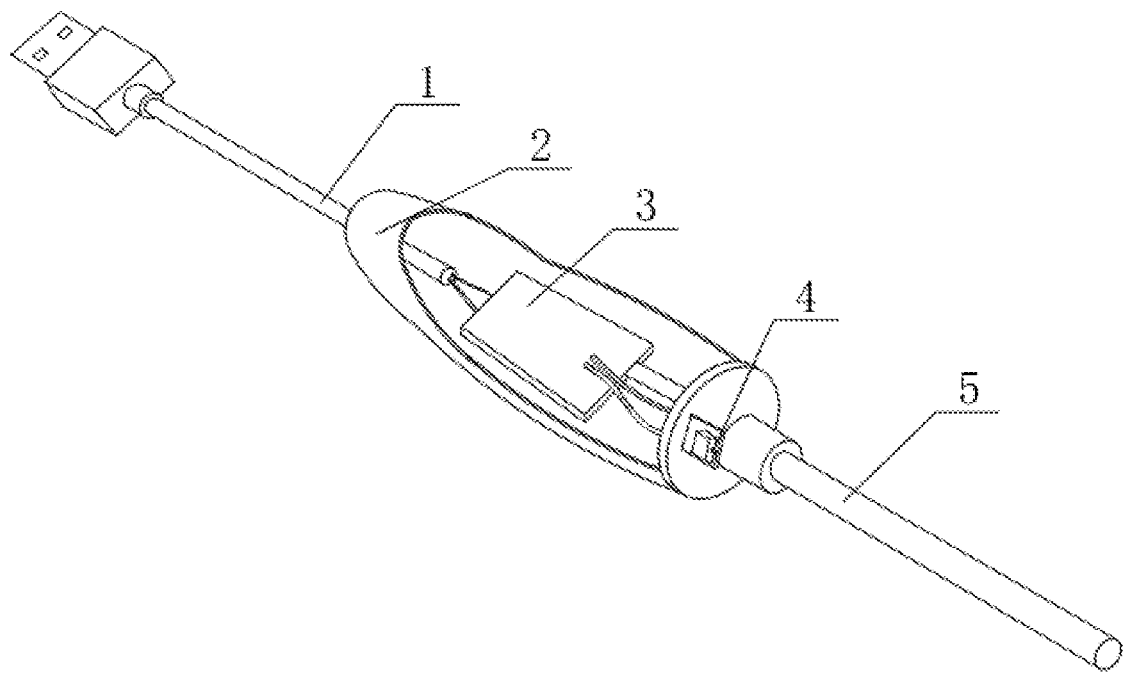
FIG. 2 is a structural schematic diagram of a circuit board.
Figure 3:
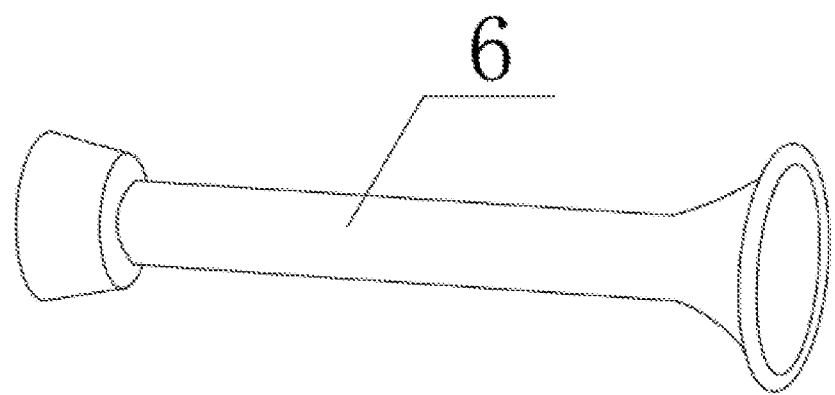
FIG. 3 is a structural schematic diagram of a first adapter.
Figure 6:
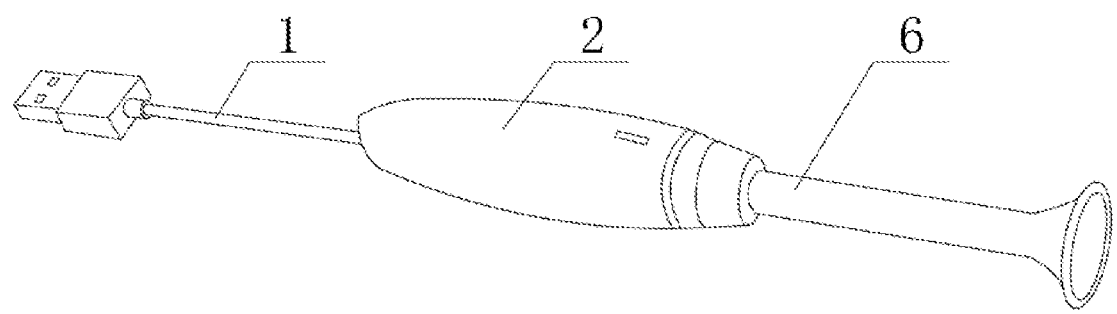
FIG. 6 is a schematic diagram of a mounting structure during use of a first adapter.

As shown in FIG. 1, FIG. 2, FIG. 3 and FIG. 6, the camera apparatus for medical detection includes a shell 2, an inner side of the shell 2 is fixedly connected to a circuit board 3, one end of the circuit board 3 is fixedly connected to a data cable 1 and is electrically connected to the data cable, and the other end of the circuit board 3 is fixedly connected to a contact sensor 4 and is electrically connected to the contact sensor 4. In some embodiments, the contact sensor 4 is fixedly connected to the shell 2. A probe 5 is arranged on an outer side of the shell 2, and the probe 5 is electrically connected to the circuit board 3. An adapting piece is sleeved on an outer side of the probe 5, the adapting piece includes a first adapter 6 buckled with one end of the shell 2, the first adapter 6 is sleeved on the outer side of the probe 5, and one end of the first adapter 6 away from the shell 2 is set as a bell mouth.

By adoption of the above technical solution: when it is necessary to detect skin or hair, the first adapter 6 is sleeved on the outer side of the probe 5 and the data cable 1 is connected to a mobile phone, a computer, a display or other devices, and at this time, the camera is electrified to enter a stand-by state; when the first adapter 6 is mounted on the outer side of the probe 5, the first adapter 6 touches the contact sensor 4, the contact sensor 4 sends a signal to the circuit board 3, the circuit board 3 controls the probe 5 to enter a working state, then the first adapter 6 slides on the surface of the skin or hair, and at the same time, the probe 5 outputs the acquired image to the mobile, the computer or other displays through the circuit board 3 and the data cable.

Embodiment 2

Figure 4:
FIG. 4 is a structural schematic diagram of a second adapter.
Figure 7:
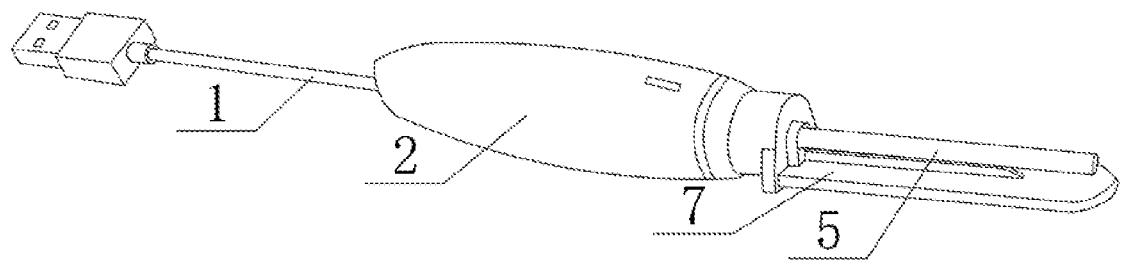
FIG. 7 is a schematic diagram of a mounting structure during use of a second adapter.

As shown in FIG. 1, FIG. 2, FIG. 4 and FIG. 7, based on Embodiment 1, the adapting piece is a second adapter 7, the second adapter 7 is in buckling connection with one end of the shell 2, the probe 5 is arranged on an upper side of the second adapter 7, and one end of the second adapter 7 away from the shell 2 is set as a flat shape.

By adoption of the above technical solution: when it is necessary to detect the oral cavity, throat or teeth, the second adapter 7 is sleeved on the outer side of the probe 5 and the data cable 1 is connected to a mobile phone, a computer, a display or other devices, and at this time, the camera is electrified to enter a stand-by state; when the second adapter 7 is mounted on the outer side of the probe 5, the second adapter 7 touches the contact sensor 4, the contact sensor 4 sends a signal to the circuit board 3, the circuit board 3 controls the probe 5 to enter a working state, and then the tongue of a patient is pressed by the second adapter 7, so that the tongue is prevented from being warped, and at the same time, the probe 5 outputs the acquired image to the mobile, the computer or other displays through the circuit board 3 and the data cable.

Embodiment 3

Figure 5:
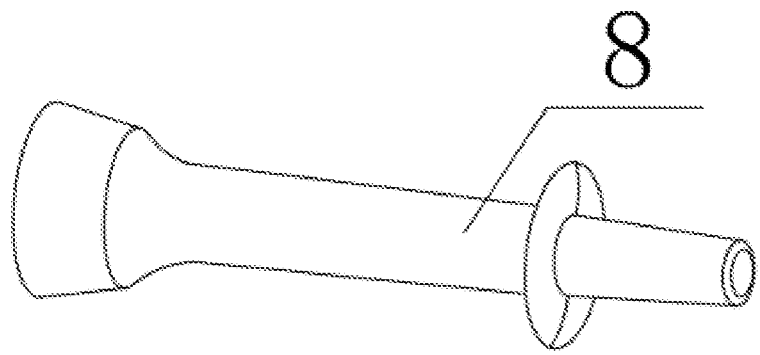
FIG. 5 is a structural schematic diagram of a third adapter.
Figure 8:
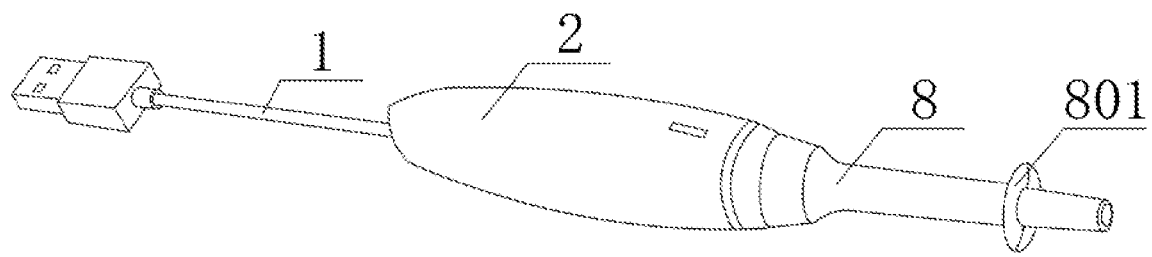
FIG. 8 is a schematic diagram of a mounting structure during use of a third adapter.

As shown in FIG. 1, FIG. 2, FIG. 5 and FIG. 8, based on Embodiment 1, the adapting piece is a third adapter 8, the second adapter 8 is in buckling connection with one end of the shell 2, a diameter of a main body part of the third adapter 8 decreases gradually from one end close to the shell 2 to one end away from the shell 2, and a retainer ring 801 is arranged on an outer side of the third adapter 8.

By adoption of the above technical solution: when it is necessary to detect the ear canal or nasal cavity, the third adapter 8 is sleeved on the outer side of the probe 5 and the data cable 1 is connected to a mobile phone, a computer, a display or other devices, and at this time, the camera is electrified to enter a stand-by state; when the third adapter 8 is mounted on the outer side of the probe 5, the third adapter 8 touches the contact sensor 4, the contact sensor 4 sends a signal to the circuit board 3, the circuit board 3 controls the probe 5 to enter a working state, and then the third adapter 8 is inserted into the ear canal or nasal cavity. According to this embodiment, the retainer ring 801 can prevent the third adapter 8 from being inserted into the ear canal or nasal cavity too deeply, and human injury can be avoided. During image acquisition, the probe 5 outputs the acquired image to the mobile phone, the computer or other displays through the circuit board 3 and the data cable.

Embodiment 4

Figure 9:
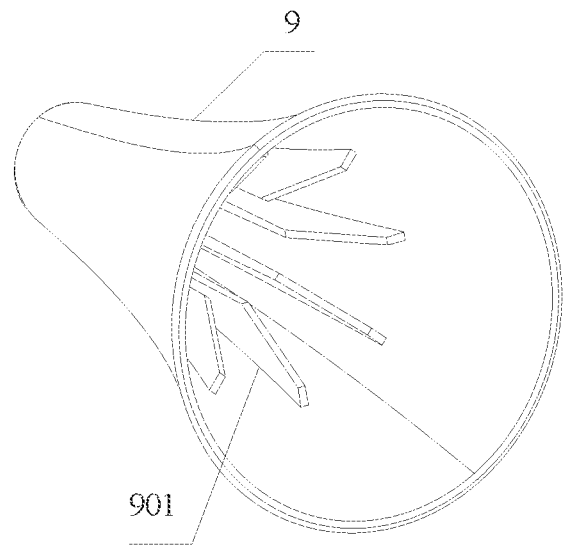
FIG. 9 is a structural schematic diagram of a fourth adapter.
Figure 10:
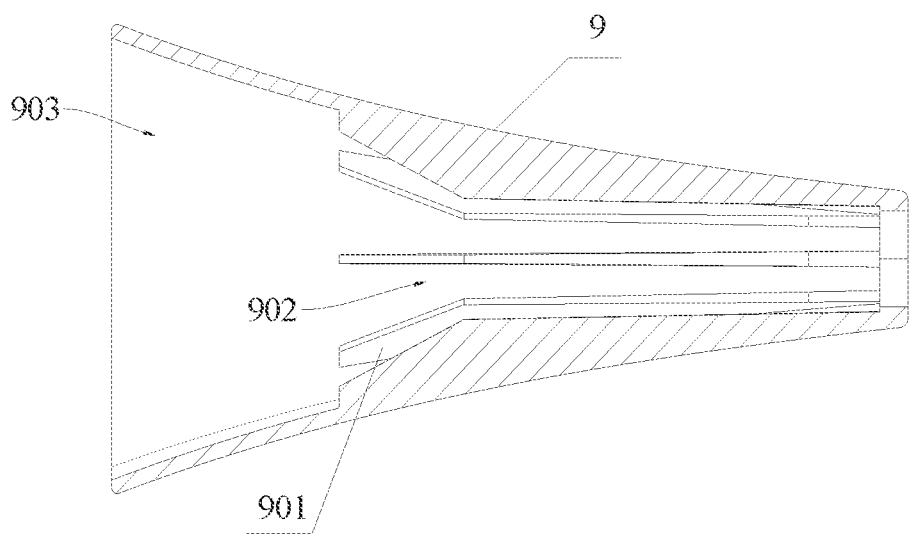
FIG. 10 is a sectional view of a fourth adapter.
Figure 11:
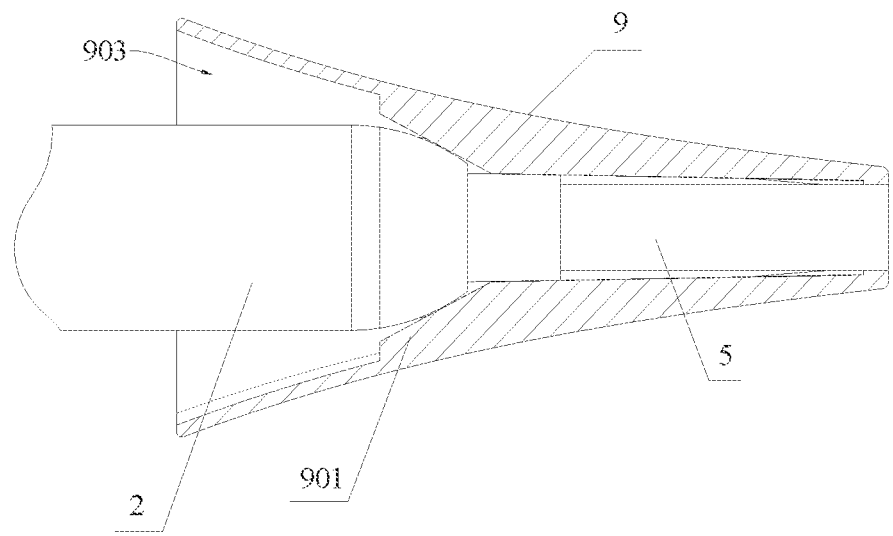
FIG. 11 is a schematic diagram of a mounting structure during use of a fourth adapter.

As shown in FIG. 1, FIG. 2, FIG. 9 and FIG. 11, based on Embodiment 1, the adapting piece is a fourth adapter 9, the fourth adapter 9 is in buckling connection with one end of the shell 2. A diameter of a main body part of the fourth adapter 9 decreases gradually from a first end close to the shell 2 to a second end away from the shell 2, and a conical body structure is formed. Several clamping ribs 901 are arranged in a circumferential direction of an inner wall of the fourth adapter 9, and a clamping channel 902 is surrounded by the several clamping ribs 901. When the adapting piece is mounted, the probe 5 extends from the first end of the fourth adapter 9 and stops when a top end of the probe 5 moves to the second end of the fourth adapter 9, and at the same time, the clamping channel 902 is buckled with the shell 2.

In addition, an accommodating cavity 903 is formed between the first end of the fourth adapter 9 and the clamping channel 902. After the adapting piece is mounted, one part of the shell 2 will remain in the accommodating cavity 903.

By adoption of the above technical solution: when it is necessary to detect the ear canal or nasal cavity, the fourth adapter 9 is sleeved on the outer side of the probe 5 and the data cable 1 is connected to a mobile phone, a computer, a display or other devices, and at this time, the camera is electrified to enter a stand-by state; when the fourth adapter 9 is mounted on the outer side of the probe 5, the fourth adapter 9 touches the contact sensor 4, the contact sensor 4 sends a signal to the circuit board 3, the circuit board 3 controls the probe 5 to enter a working state, and then the fourth adapter 9 is inserted into the ear canal or nasal cavity. The fourth adapter 9 has a conical body structure, so the fourth adapter 9 can be prevented from being inserted into the ear canal or nasal cavity too deeply, and human injury can be avoided. During image acquisition, the probe 5 outputs the acquired image to the mobile phone, the computer or other displays through the circuit board 3 and the data cable.

Embodiment 5

Figure 12:
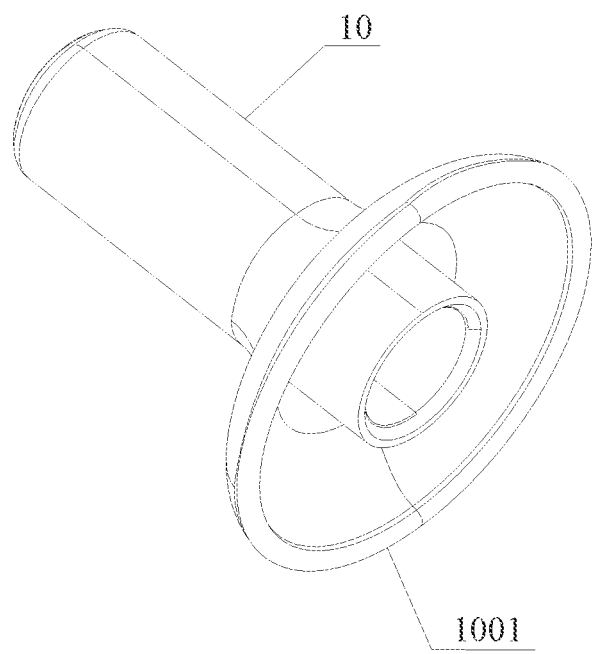
FIG. 12 is a structural schematic diagram of a fifth adapter.
Figure 13:
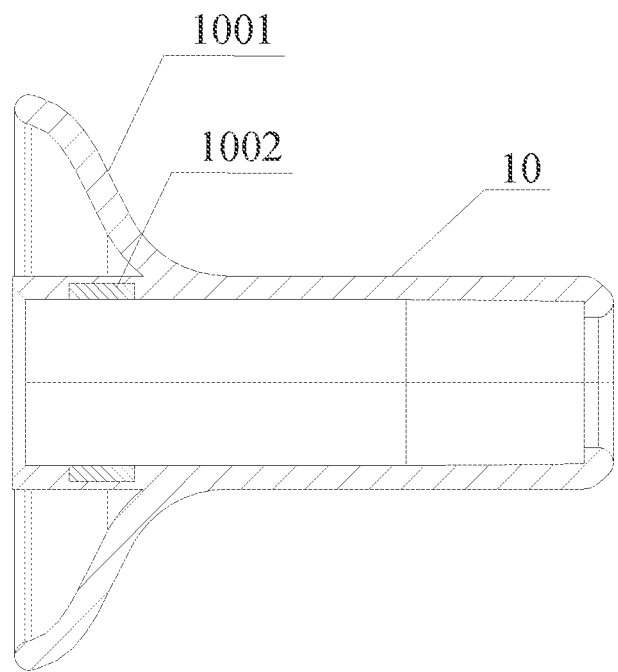
FIG. 13 is a sectional view of a fifth adapter.
Figure 14:
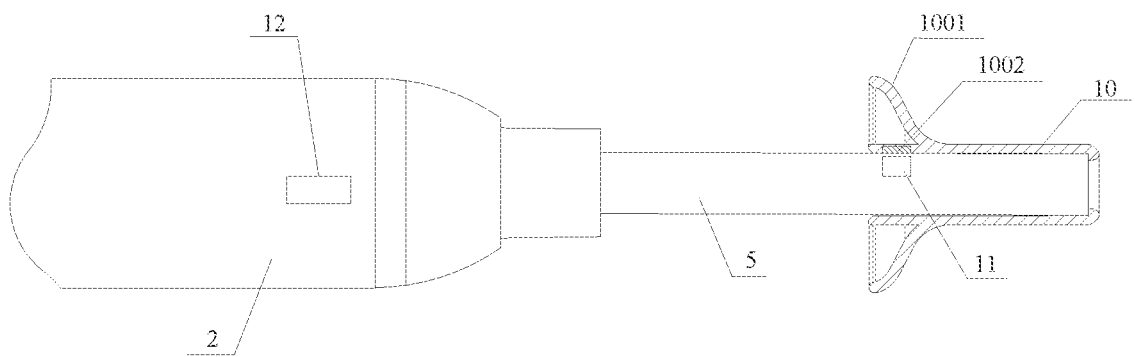
FIG. 14 is a schematic diagram of a mounting structure during use of a fifth adapter.

As shown in FIG. 1, FIG. 2, FIG. 12 and FIG. 14, the camera apparatus for medical detection includes a shell 2, an inner side of the shell 2 is fixedly connected to a circuit board 3, one end of the circuit board 3 is fixedly connected to a data cable 1 and is electrically connected to the data cable, and the other end of the circuit board 3 is connected to a non-contact sensor 11 and is electrically connected to the contact sensor 4. A probe 5 is arranged on an outer side of the shell 2, and the probe 5 is electrically connected to the circuit board 3. The non-contact sensor 11 is fixedly mounted in the probe 5. An adapting piece is sleeved on the outer side of the probe 5, the adapting piece is a fifth adapter 10, and a first end of the fifth adapter 10 is in buckling connection with the shell 2. A ring cover 1001 is arranged on an outer side of the fifth adapter 10 close to the first end of the fifth adapter.

In some embodiments, the cross section of the ring cover 1001 has an arc-shaped structure; the arc-shaped structure gradually extends outwards in a direction of the first end of the fifth adapter 10 and in a radial direction of the fifth adapter 10; and one side of the arc-shaped structure facing away from the first end of the fifth adapter 10 and an outer wall of the fifth adapter 10 are in smooth transition.

In this embodiment, the non-contact sensor 11 is a Hall sensor, so several magnets 1002 are arranged in a circumferential direction of the first end of the fifth adapter 10. When the fifth adapter 10 is sleeved at the set position of the probe, the Hall sensor will sense the magnetic field of the magnet 1002 and sends a signal to the circuit board. In addition, to better understand the working state of the apparatus, an indicator lamp 12 is arranged on the shell 2, and the indicator lamp is electrically connected to the circuit board. In some embodiments, the state of the apparatus can be determined according to the color of the indicator lamp. For example, when the indicator lamp is red and flashing, it means that the power is on but the adapting piece is not mounted; and when the adapting piece is mounted at the set position of the probe 5, the indicator lamp turns green and is always on, the apparatus enters the working state, and at this time, the apparatus can be used normally. The indicator lamp in this embodiment is also suitable for other embodiments described above, and is also configured to display the working state of the apparatus. However, the color, flashing frequency, number and shape of the indicator lamp are not specifically limited.

By adoption of the above technical solution: when it is necessary to detect the ear canal or nasal cavity, the fifth adapter 10 is sleeved on the outer side of the probe 5 and the data cable 1 is connected to a mobile phone, a computer, a display or other devices, and at this time, the camera is electrified to enter a stand-by state; when the fifth adapter 10 is mounted on the outer side of the probe 5, the non-contact sensor 11 senses the magnetic field of the magnet 1002 of the fifth adapter 10, the non-contact sensor 11 sends a signal to the circuit board 3, the circuit board 3 controls the probe 5 to enter a working state, and then the fifth adapter 10 is inserted into the ear canal or nasal cavity. In this embodiment, the ring cover 1001 can prevent the fifth adapter 10 from being inserted into the ear canal or nasal cavity too deeply, and human injury can be avoided. During image acquisition, the probe 5 outputs the acquired image to the mobile phone, the computer or other displays through the circuit board 3 and the data cable.

Of course, the non-contact sensor 11 is configured to detect whether one of the detection sensors in the adapting piece is mounted on the detection probe 5. The detection sensor provided by the present application may be other types of sensors for obtaining a position or distance, and includes a contact sensor and a non-contact sensor, for example, a travel switch and a Hall sensor.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure should be included in the scope of protection of the present disclosure.

What is claimed is:

1. A camera apparatus for medical detection, comprising a shell,
a circuit board arranged in the shell, and
a detection sensor electrically connected to the circuit board,
wherein a probe is arranged on an outer side of the shell, the probe is electrically connected to the circuit board, and an adapting piece is sleeved on an outer side of the probe;
the detection sensor is configured to detect whether the adapting piece is mounted at a set position of the probe or not; and the circuit board controls a working state of the probe according to the detection result of the detection sensor;
wherein the adapting piece comprises an adapter, and the adapter is in buckling connection with one end of the shell; a plurality of clamping ribs are arranged in a circumferential direction of an inner wall of the adapter, a clamping channel is surrounded by the plurality of clamping ribs, and the clamping channel is buckled with the shell.

2. The camera apparatus for medical detection according to claim 1,
wherein
a diameter of a main body part of the adapter gradually decreases from a first end facing the shell to a second end away from the shell.

3. The camera apparatus for medical detection according to claim 2,
wherein an accommodating cavity is formed between the first end of the adapter and the clamping channel; and when the adapter is buckled with the shell, one part of the shell will remain in the accommodating cavity.

4. The camera apparatus for medical detection according to claim 1,
wherein the detection sensor is a non-contact sensor or a contact sensor;
the detection sensor is arranged at the probe or the shell; and when the adapting piece is mounted at the set position of the probe, the detection sensor is capable of detecting the adapting piece or a sensing device mounted on the adapting piece.

5. The camera apparatus for medical detection according to claim 1,
wherein the shell is provided with an indicator lamp for displaying a working state of the apparatus, and the indicator lamp is electrically connected to the circuit board.

6. The camera apparatus for medical detection according to claim 1, further comprising a data cable;
wherein one end of the circuit board is fixedly and electrically connected to the data cable; the data cable is connected to an external display device.

7. A camera apparatus for medical detection, comprising a shell,
a circuit board arranged in the shell, and
a detection sensor electrically connected to the circuit board,
wherein a probe is arranged on an outer side of the shell, the probe is electrically connected to the circuit board, and an adapting piece is sleeved on an outer side of the probe;
the detection sensor is configured to detect whether the adapting piece is mounted at a set position of the probe or not; and the circuit board controls a working state of the probe according to the detection result of the detection sensor;
wherein the adapting piece comprises an adapter; and a first end of the adapter is in buckling connection with one end of the probe away from the shell, and a ring cover is arranged on an outer side of the adapter;

wherein the detection sensor is a Hall sensor, a plurality of magnets are arranged in a circumferential direction of the first end of the adapter; when the adapter is sleeved at the set position of the probe, the Hall sensor senses a magnetic field of the magnet and sends a signal to the circuit board.

8. The camera apparatus for medical detection according to claim 7, wherein the cross section of the ring cover has an arc-shaped structure, the arc-shaped structure gradually extends towards a direction of the first end of the adapter and in a radial direction of the adapter, and one side of the arc-shaped structure facing away from the first end of the adapter and an outer wall of the adapter are in smooth transition.

* * * * *